(12) United States Patent
Gupta et al.

(10) Patent No.: US 12,591,627 B2
(45) Date of Patent: Mar. 31, 2026

(54) ENHANCED AUTO-SUGGESTION FUNCTIONALITY

(71) Applicant: Microsoft Technology Licensing, LLC, Redmond, WA (US)

(72) Inventors: Manish Gupta, Hyderabad (IN); Puneet Agrawal, Jaipur (IN); Biju Venugopal, Hyderabad (IN); Sushil Kumar Chordia, Hyderabad (IN); Anand Raman, Gachibowli (IN); Shveta Verma, Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/509,978

(22) Filed: Nov. 15, 2023

(65) Prior Publication Data

US 2025/0156486 A1      May 15, 2025

(51) Int. Cl.
*G06F 16/9532* (2019.01)
*G06F 16/9535* (2019.01)
*G06F 40/40* (2020.01)

(52) U.S. Cl.
CPC ...... *G06F 16/9532* (2019.01); *G06F 16/9535* (2019.01); *G06F 40/40* (2020.01)

(58) Field of Classification Search
CPC ... G06F 16/9532; G06F 16/9535; G06F 40/40
See application file for complete search history.

(56) References Cited

U.S. PATENT DOCUMENTS

| | | | | |
|---|---|---|---|---|
| 5,963,940 | A * | 10/1999 | Liddy | G06F 16/353 |
| | | | | 707/999.005 |
| 6,026,388 | A * | 2/2000 | Liddy | G06F 16/3344 |
| | | | | 707/999.005 |
| 6,578,032 | B1 * | 6/2003 | Chandrasekar | G06F 16/30 |
| 8,639,713 | B2 * | 1/2014 | Carpenter | G06F 16/245 |
| | | | | 707/764 |
| 8,660,849 | B2 * | 2/2014 | Gruber | B60K 35/10 |
| | | | | 340/988 |
| 8,768,909 | B2 * | 7/2014 | Carpenter | G06Q 30/02 |
| | | | | 707/711 |
| 9,405,841 | B2 * | 8/2016 | Amacker | G06Q 30/0643 |
| 9,922,344 | B1 * | 3/2018 | Christophe | G06Q 30/0256 |
| 10,276,170 | B2 * | 4/2019 | Gruber | G06F 16/9537 |
| 10,505,825 | B1 * | 12/2019 | Bettaiah | G06F 16/24578 |
| 11,636,128 | B1 * | 4/2023 | Bigdelu | G06F 16/2428 |
| | | | | 707/722 |
| 11,644,955 | B1 * | 5/2023 | Singamneni | G06F 3/0481 |
| | | | | 707/722 |
| 2005/0234879 | A1 * | 10/2005 | Zeng | G06F 16/951 |

(Continued)

*Primary Examiner* — Mark E Hershley
(74) *Attorney, Agent, or Firm* — Ray Quinney & Nebeker P.C.; Christopher K. Hallstrom

(57) ABSTRACT

A system for providing enhanced search functionality is provided. A system may receive a prefix from a user device and identify that a user's intent is to do an exploratory query. The system may further identify a topic based on the prefix and generate one or more associated queries relating to the topic. The system may further generate one or more headings relating to the topic. The system may then provide one or more of the one or more headings and the one or more associated queries relating to the topic to a user device.

20 Claims, 14 Drawing Sheets

(56)                References Cited

U.S. PATENT DOCUMENTS

| | | | |
|---|---|---|---|
| 2009/0019026 A1* | 1/2009 | Valdes-Perez ........ G06F 16/285 | |
| | | | 707/999.005 |
| 2009/0171929 A1* | 7/2009 | Jing ................... G06F 16/3322 | |
| | | | 707/999.005 |
| 2009/0249198 A1* | 10/2009 | Davis ................... G06F 40/284 | |
| | | | 715/261 |
| 2009/0254971 A1* | 10/2009 | Herz ...................... G06Q 10/10 | |
| | | | 726/1 |
| 2010/0198837 A1* | 8/2010 | Wu ................... G06F 16/24578 | |
| | | | 707/E17.014 |
| 2010/0250497 A1* | 9/2010 | Redlich ................. G06Q 10/06 | |
| | | | 707/661 |
| 2010/0306228 A1* | 12/2010 | Carpenter ............. G06Q 30/02 | |
| | | | 707/765 |
| 2011/0161311 A1* | 6/2011 | Mishne .............. G06F 16/3322 | |
| | | | 707/769 |
| 2011/0246910 A1* | 10/2011 | Moxley ................. G06Q 10/10 | |
| | | | 707/706 |
| 2011/0270819 A1* | 11/2011 | Shen ................... G06F 16/9535 | |
| | | | 707/777 |
| 2014/0244610 A1* | 8/2014 | Raman ................. G06F 16/951 | |
| | | | 707/723 |
| 2014/0279993 A1* | 9/2014 | Bernhardt ........... G06F 16/3322 | |
| | | | 707/706 |
| 2015/0262077 A1* | 9/2015 | White .................... G06N 20/00 | |
| | | | 706/12 |
| 2016/0042069 A1* | 2/2016 | Lee-Goldman ........ G06Q 50/00 | |
| | | | 707/706 |
| 2016/0054915 A1* | 2/2016 | Lynch ................ G06F 3/04842 | |
| | | | 715/765 |
| 2016/0306798 A1* | 10/2016 | Guo ...................... G06F 16/248 | |
| 2017/0185673 A1* | 6/2017 | Liu ...................... G06F 16/242 | |
| 2017/0308583 A1* | 10/2017 | Husain ................ G06F 16/9024 | |
| 2017/0308589 A1* | 10/2017 | Liu ................... G06F 16/9535 | |
| 2018/0060340 A1* | 3/2018 | Hazra .............. G06F 16/90324 | |
| 2019/0258719 A1* | 8/2019 | Baker ................ G06F 16/9538 | |
| 2020/0151577 A1* | 5/2020 | Ogawa .............. G06Q 30/0282 | |
| 2021/0049514 A1* | 2/2021 | Neumann ................ G06N 7/01 | |
| 2021/0174164 A1* | 6/2021 | Hsieh .................... G06N 3/044 | |
| 2022/0107802 A1* | 4/2022 | Rao ...................... G06F 16/907 | |
| 2022/0188306 A1* | 6/2022 | Bigdelu ................ G06F 16/252 | |
| 2023/0004592 A1* | 1/2023 | Mostafa ............. G06F 16/3334 | |
| 2023/0244678 A1* | 8/2023 | Hill .................... G06F 16/3329 | |
| | | | 707/748 |
| 2023/0394040 A1* | 12/2023 | Gupta ............... G06F 16/90324 | |
| 2024/0020538 A1* | 1/2024 | Socher ................. G06F 16/243 | |
| 2024/0127026 A1* | 4/2024 | Manandise ........... G06N 3/006 | |
| 2024/0312451 A1* | 9/2024 | McCourt, Jr. ........... G06N 7/01 | |
| 2024/0320958 A1* | 9/2024 | Ziai ..................... G06V 10/776 | |

* cited by examiner

300

| User Profile 334 | Session History 336 | Exploratory Query Count 338 | Prefix 324 |
|---|---|---|---|
| Age: 20<br>Occupation: student<br>Location: Boston<br><br>Recently browsed:<br>Mit.edu<br>Mygreatlearning.com<br>Introtodeeplearning.com<br>linkedin.com/learning<br><br>Long search history:<br>Neural networks<br>Rectified liner unit<br>Artificial neuron<br>⋮ | Neural networks<br>ReLU<br>Multilayer perceptron | Monday: 1  (5%)<br>Tuesday: 3 (15%)<br>Wednesday: 10 (10%)<br>Thursday: 4 (40%)<br>Friday: 7 (70%)<br>Saturday: 2 (50%)<br>Sunday: 0 (0%) | Convolut |

First UI
716

724

Transmitter/Receiver
718

744/
746

Second UI
720

724

744 / 746

Computing Device
702

848     850     852     854     856     858

| Original | Flights | Hotel | Eat | Things to do | Visa |
|----------|---------|-------|---------|--------------|------|

← 846

Most famous places to eat in Vienna? Traditional Austrian food in Vienna? Best pizza places in Vienna?

～ 820

844

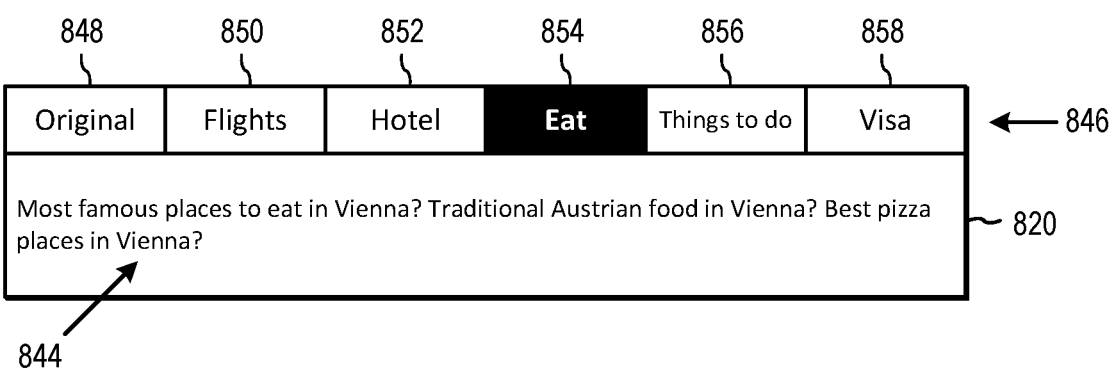

| Original | Flights | Hotel | Eat | Things to do | Visa |
|----------|---------|-------|-----|------------------|------|

← 846

Top attractions of Vienna? Horseback riding in Vienna? Museums in Vienna? Best sceneries in Vienna by walking?

～ 820

844

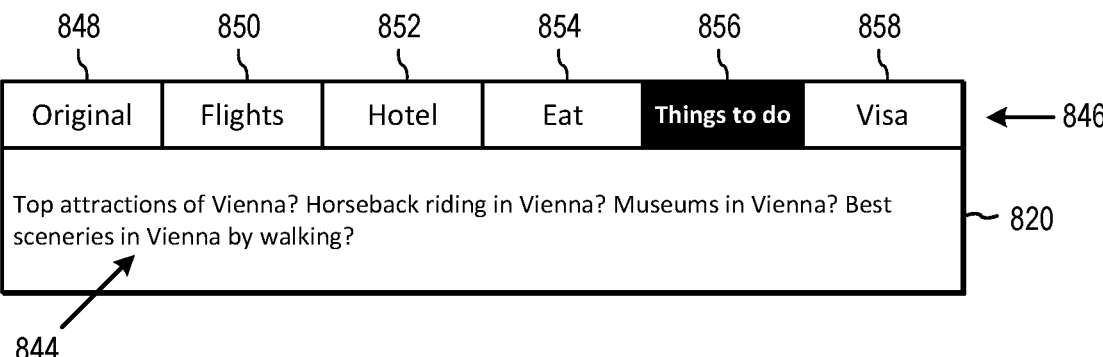

| Original | Flights | Hotel | Eat | Things to do | Visa |
|----------|---------|-------|-----|--------------|----------|

← 846

Where can I apply for a visa to Austria from India? How long will it take to get a visa? What type of visa do I need? What is the cost of obtaining a visa?

～ 820

844

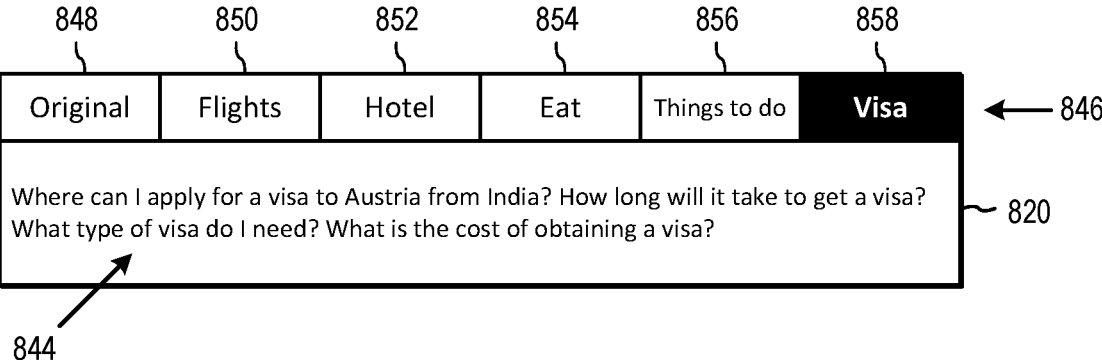

FIG. 8-7 cnn_

924

916

What are convolutional neural networks? What are popular hyperparameters for convolutional neural networks? How are filters in a convolutional neural networks trained? How does rectified linear unit activation work?

916

944

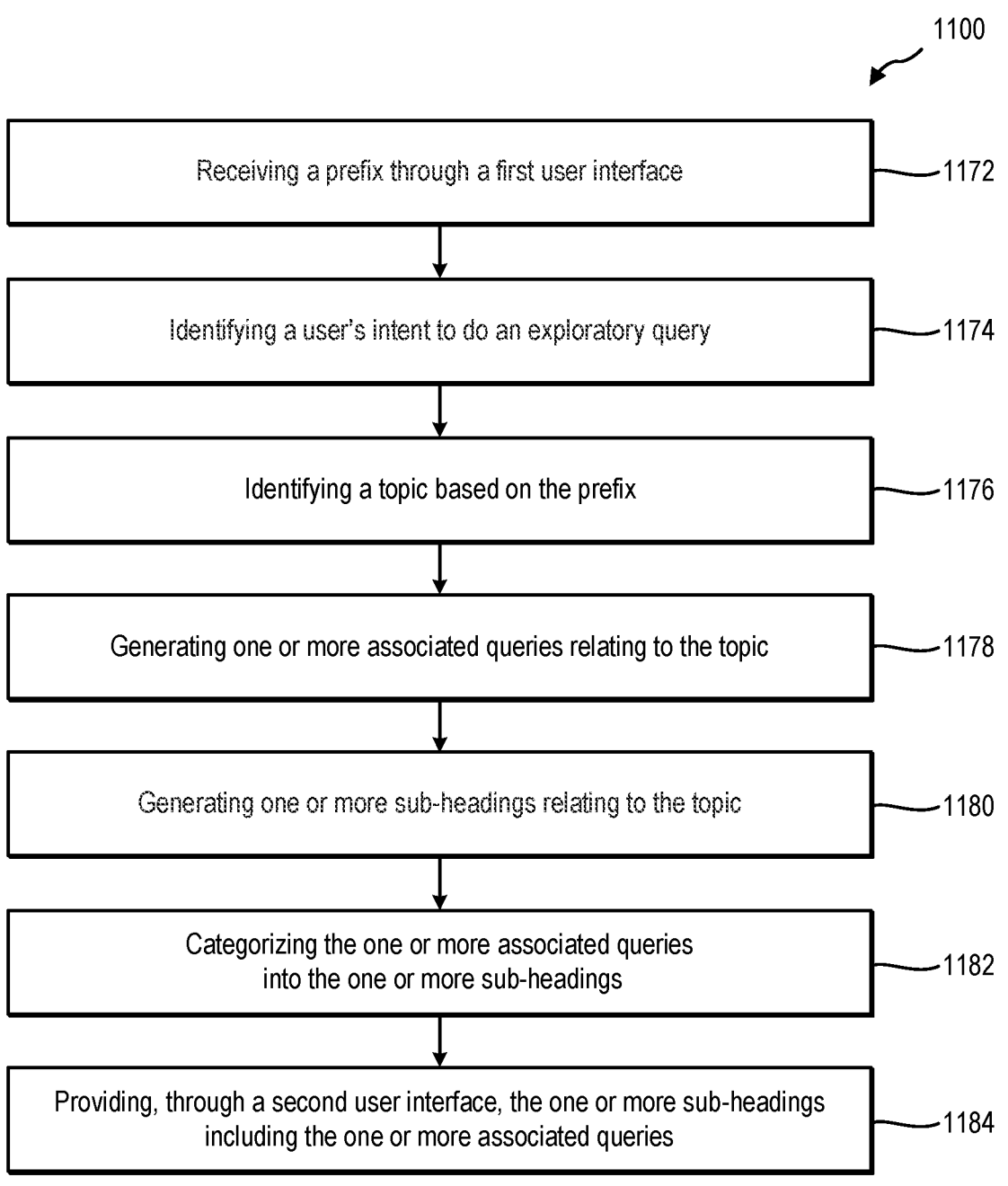

1100

Receiving a prefix through a first user interface — 1172

Identifying a user's intent to do an exploratory query — 1174

Identifying a topic based on the prefix — 1176

Generating one or more associated queries relating to the topic — 1178

Generating one or more sub-headings relating to the topic — 1180

Categorizing the one or more associated queries into the one or more sub-headings — 1182

Providing, through a second user interface, the one or more sub-headings including the one or more associated queries — 1184

Receiving, at a first user interface, a prefix, wherein the prefix relates to a topic — 1286

Transmitting the prefix to a computing device — 1288

Receiving, from the computing device, one or more sub-headings relating to the topic — 1290

Presenting, at a second user interface, the one or more sub-headings — 1292

1300

ENHANCED AUTO-SUGGESTION FUNCTIONALITY

CROSS-REFERENCE TO RELATED APPLICATIONS

N/A

BACKGROUND

Internet has provided an easy access to both store and retrieve information worldwide. Search engines, such as Google and Bing, provide an easy interface for a user to search for information. The mainstream search engines today use a keyword-based document indexing and retrieval systems. A traditional search engine will return search results based on a query submitted by a user by ranking the results based on the keywords. Some search engines also provide suggestions to improve user's input to obtain more relevant keywords for search.

BRIEF SUMMARY

In some embodiments, a method for providing enhanced search capabilities is provided. The method includes receiving a prefix and identifying a user's intent to do an exploratory query. The method further includes identifying a topic based on the prefix and generating one or more associated queries relating to the topic. The method further includes generating one or more headings relating to the topic and providing one or more of the one or more headings or the one or more associated queries relating to the topic.

In other embodiments, a method for providing enhanced search capabilities is provided. The method includes receiving a prefix through a first user interface and identifying a user's intent to do an exploratory query. The method further includes identifying a topic based on the prefix and generating one or more headings relating to the topic. The method further includes generating one or more associated queries relating to the topic and categorizing the one or more associated queries into the one or more headings. The method further includes providing through a second user interface the one or more headings including the one or more associated queries.

In yet other embodiments, a method of receiving enhanced search options is provided. The method includes receiving at a first user interface a prefix, wherein the prefix relates to a topic and transmitting the prefix to a computing device. The method further includes receiving from the computing device one or more headings relating to the topic and presenting at a second user interface, the one or more headings.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 3 illustrates an example of possible information used by the enhanced search system for identifying user's intent, in accordance with one or more embodiments.

FIGS. 8-1 through 8-7 illustrate an example of user interfaces (UIs) of a possible implementation of the enhanced search system in accordance with one or more embodiments.

FIGS. 9-1 and 9-2 illustrate an example of user interfaces (UIs) of a possible implementation of the enhanced search system in accordance with one or more embodiments.

FIG. 11 illustrates a series of acts for providing enhanced search capabilities in a computing network, in accordance with one or more embodiments.

DETAILED DESCRIPTION

Figure 1:
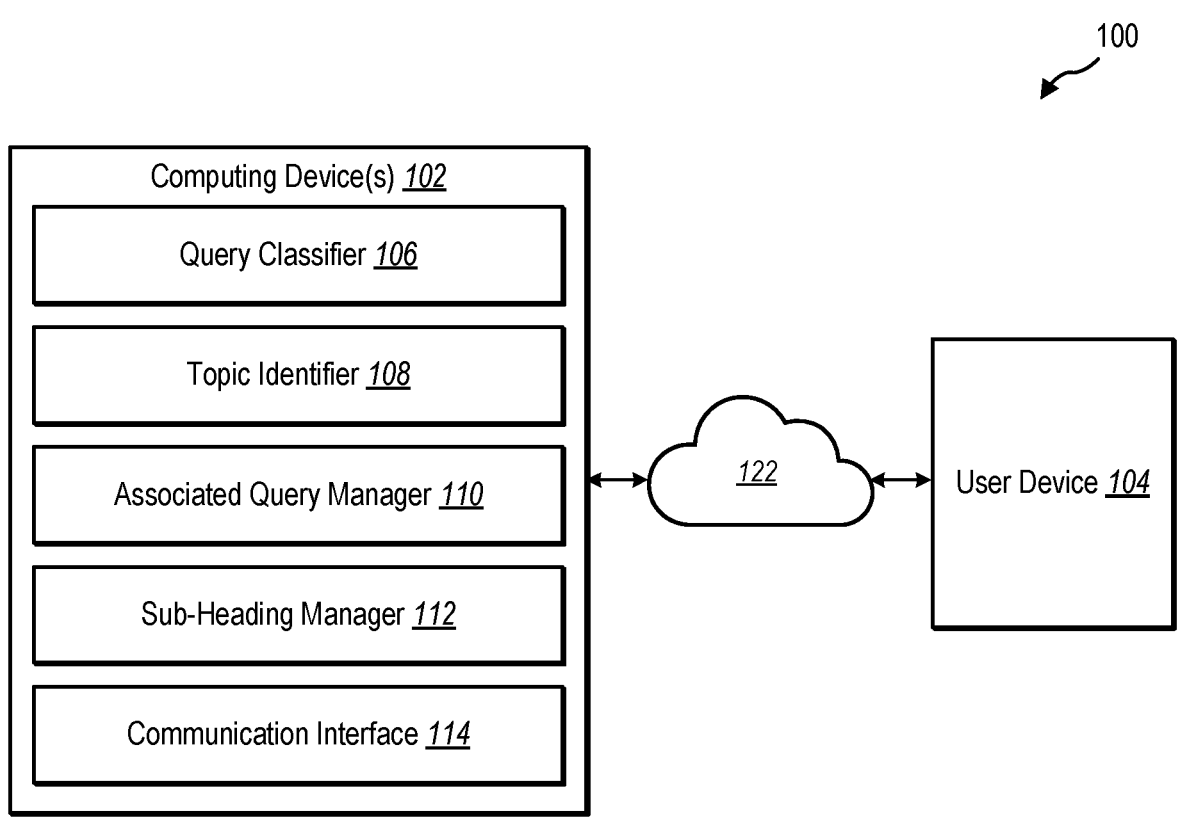
FIG. 1 illustrates an example environment showing systems and devices implementing an enhanced search functionality, in accordance with one or more embodiments.

This disclosure generally relates to providing enhanced search capabilities for a user. Traditionally, search queries are submitted one by one to receive relevant search results for a particular question. If a user needs to research a broader topic with various subtopics, they will likely need to search for each sub-topic separately to get meaningful search results. Autosuggestion may improve a user's typing experience by providing one or more suggested words and/or a sentence to complete a prefix while the user is typing their search query. However, autosuggestion is unable to provide more than one query at a time. Furthermore, inputting multiple queries at the same time to cover various subtopics or various aspects of a topic may not provide the best search results to any of the multiple queries as a keyword-based search will rank the results based on which result includes most of the keywords. In fact, with traditional search methods, the user is more likely to get the most relevant results when each subtopic is searched separately.

The features and functionalities described herein provide a number of advantages and benefits over conventional approaches and systems. For example, the systems described herein provide features and functionality related to providing enhanced search capabilities. Indeed, the systems described here identify user's intent to do an exploratory query and provide associated queries around the searched topic to cover broader sub-categories around the searched topic. For example, when a user types in 'covid symptoms', an enhanced search can provide not only covid symptoms, but also information about closest pharmacies, price information about covid tests, nearest urgent care places, methods to relieve covid symptoms, etc.

One possible advantage of providing enhanced search capabilities is to provide a fully immersive search experience where the searched topic is broadly covered from various different aspects instead of only doing focused search with provided search string. These long elaborate queries provided with the systems and methods described herein may capture the user's intent more fully, than a single search string might. Furthermore, when various different sub-areas around the topic are identified and the associated queries are provided, performing all relevant search queries at the same time may satisfy multiple different aspects of the user's intent simultaneously by providing faster and more exhaustive ways to perform a search. In addition, it may reduce the number of single searches required to be performed to cover plurality of sub-areas.

In addition to providing enhanced search capabilities, the systems described herein include features relating to generating headings that relate to an identified topic and categorizing the associated queries under each heading. In particular, the systems and method may use deep learning models to generate headings and associated queries that relate to the topic and present them on a user device. One possible advantage of generating headings and categorizing the associated queries under them is that the user is provided with a clear user interface with a plurality of related sub-categories with their own heading for easy navigation between each heading with a plurality of options to choose from. Another possible advantage is that the user is advised on related issues, some of which might be issues the user wasn't even aware of. For example, when a user types in 'trip to New Zealand', one of the headings created might relate to 'prohibited items to bring to the New Zealand', which might be something the user was not aware of and wouldn't have known to search for in the first place.

As illustrated in the foregoing discussion, the present disclosure utilizes a variety of terms to describe features and/or advantages of the present disclosure herein. Additional detail is now provided regarding the meaning of some example terms.

In an example, autosuggestion refers to a software feature that intends to improve a user's typing experience by providing one or more suggested words and/or sentence to complete the query while the user is typing. In many cases, the autosuggestion will try to identify the word and/or the sentence being typed with each new character the user submits.

In an example, search queries may be categorized into three different groups based on the user's intent: navigational, transactional, and exploratory. In an example, a navigational query is a query where the user's intent is to navigate to a particular website. The user knows what webpage they want to go to, and instead of typing the full webpage address, they can just search for the page with search query. For example, a user intends to navigate to Facebook, by typing 'facebook' in their search window. In an example, a transactional query is a query where the user's intent is to perform a transaction, such as book a flight, buy groceries, etc. A transactional query cannot be fulfilled by a search engine, a search engine may provide search results and the user may use those search results to reach a website where the intent to perform a transaction may be fulfilled. For example, a user's intent is to book a flight to Vienna, the user may search for 'travel agencies' or 'flights to Vienna' and may use the provided search results to reach a website where the user's intent can be fulfilled. In an example, an exploratory query is a query where the user's intent is to perform a broader research around a topic or to explore a broader topic. In general, the user might not be quite sure what they are looking for when initiating the search. For example, the user may want to learn more about different college options around them, or they may want to research blockchain technology in general. Typically, a single query will not satisfy the needs of a user when the user intends to do an exploratory query. For example, the user may need to perform multiple different search queries to find enough information about their topic.

FIG. 1 illustrates an example environment 100 showing systems and devices implementing an enhanced search functionality, in accordance with one or more embodiments. As shown in FIG. 1, the environment 100 includes one or more computing device(s) 102 and a user device 104. The one or more computing device(s) 102 may be in communication with the user device 104 via a communication network 122. The communication network 122 may include a plurality of different communication networks, such as a cloud computing network, Internet, a telecommunication network, a fixed network, and a WLAN network.

The user device 104 may refer to a variety of computing devices or end-user devices. For example, the user device 104 may refer to a mobile or non-mobile user device, such as a laptop, desktop, phone, tablet, information of things (IoT) device, or other device capable of communicating with computing device(s) 102 on the cloud computing system via one or more communication network 122. Additional details of the user device 104 are further discussed in connection to FIG. 6.

As shown in FIG. 1, the one or more computing device(s) 102 includes a query classifier 106, a topic identifier 108, an associated query manager 110, a heading manager 112, and a communication interface 114. In one or more embodiments, the communication interface 114 may be based on wired communication technology, wireless communication technology, or both. For example, the communication interface 114 may include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, an infrared (IR) communication port, or a combination thereof.

In one or more embodiments, the communication interface 114 is configured to receive a prefix. For example, the communication interface 114 may receive the prefix from the user device 104 through the communication network 122. In one or more embodiments, a prefix is a fully typed query. For example, a prefix may include the whole sentence or the whole word that a user intents to search. For example, a fully typed sentence the user wishes to search for may be 'convolutional neural network', and a fully typed word the user wishes to search for may be 'convolutional'. In another example, a prefix may be partially typed query. For example, it may be partially typed sentence or partially typed word. For example, a prefix may be 'convolu' or 'convolutional ne.'

As shown in FIG. 1, the one or more computing device(s) 102 further includes a query classifier 106. In one or more embodiments, the query classifier 106 is configured to identify a user's intent to do an exploratory query. In one or more embodiments, the query classifier 106 uses various different inputs to identify the user's intent. For example, the query classifier 106 may use one or more of a user profile information, a session history information, an exploratory query count information, and the received prefix as inputs for a deep learning model, or any other machine learning model trained to classify a query into two or more categories, such as a navigation, a transactional, or an exploratory query. In some embodiments, the query classifier 106 classifies the query into two categories, such as exploratory query and non-exploratory query.

In one or more embodiments, the session history information is the history of queries performed during the ongoing session. For example, a user may perform a first search on 'Vienna', and a second search on 'flights to Vienna'. These two prior searches indicate a common theme, so when the user inputs a third search on 'Hotels in Vienna', the system may now classify, based on the session history and the prefix, that the third query is an exploratory query, based on the common theme between the session history ('Vienna' and 'flights to Vienna') and the current prefix ('Hotels in Vienna'). In one or more embodiments, a session is a short time window. For example, it may be five minutes, thirty minutes, one hour, two hours, less than five minutes, or more than two hours. In one or more embodiments, a session is an uninterrupted search history without clearing the old searches. For example, a user interface may provide an option to clear out prior search history and start with a new one, hence as long as the user does not clear out the prior search history, the session history may include all the searches done. Additional examples about session history information are further discussed in connection to FIG. 3 and FIG. 4.

In one or more embodiments, the user profile information may include demographic information about the user, such as age, location, etc. In one or more embodiments, the user profile may also include a long search history of the user. For example, a long search history may include searches done beyond the session history discussed above. In one or more embodiments, the user profile may also include information about pages the user has browsed previously. Additional details about user profile information are further discussed in connection to FIG. 3 and FIG. 4.

In one or more embodiments, the exploratory query count information includes the number of exploratory queries done by a user previously. For example, the number of exploratory queries done by a user may be higher than a typical user might have, hence each prefix the user inputs have higher likelihood of being classified as exploratory query based on the exploratory query count information. Additional details about exploratory query count information are further discussed in connection to FIG. 3.

In one or more embodiments, the prefix includes a partial word, a partial sentence, a full word, a full sentence, or a combination thereof. In one or more embodiments, the prefix is a fully typed query. Additional examples of various prefixes are further discussed in connection to FIGS. 4, 5, 8-1 and 9-1.

As shown in FIG. 1, the one or more computing device(s) 102 further includes a topic identifier 108. In one or more embodiments, the topic identifier 108 is configured to identify a topic based on the prefix. For example, if the prefix is 'convolu', the topic identifier 108 may identify the topic as 'convolutional neural network.' In one or more embodiments, the topic identifier 108 inputs the prefix to a pretrained generative large language model (LLM) to obtain the topic. For example, a generative LLM may be OpenAI's GTP models, Google's Bard, Meta's LLaMa, BigScience BLOOM, DALL-E, etc. One possible advantage of using a pre-trained generative model for identifying a topic based on the prefix is that the LLM model is pretrained with a variety of inputs (e.g., a variety of human languages, a variety of programming languages, and/or a variety of content types, and therefore need not be finetuned or trained for a specific scenario.

In one or more embodiments, the topic identifier 108 provides two or more different inputs to a deep learning model, or to any other machine learning model that is trained to identify a topic based on one or more different inputs. For example, the topic identifier 108 may use one or more of a user profile information, a session history information, an exploratory query count information, and the received prefix as inputs for the deep learning model, or to the machine learning model to identify a topic. In one or more embodiments, the topic identifier 108 is configured to identify the topic separately from the user's intent identification performed by the query classifier 106. In one or more embodiments, the topic identifier 108 is configured to identify the topic together with the user's intent identification performed by the query classifier 106.

As shown in FIG. 1, the one or more computing device(s) 102 further includes an associated query manager 110. In one or more embodiments, the associated query manager 110 is a software that intends to identify related aspects/concepts (e.g., associated queries) surrounding the topic being searched. Associated query differs from autosuggestions in a way that, where autosuggestion will attempt to identify words and sentences directly derived from the prefix, the associated query manager 110 will attempt to derive new related queries (e.g., associated queries) based on the identified topic (e.g., the original query). In one or more embodiments, the associated query manager 110 receives from the topic identifier 108, the identified topic and uses the identified topic to generate one or more associated queries. For example, the associated query manager 110 may use a deep learning model or a machine learning model that has been trained to generate associated queries, to generate the one or more associated queries for a topic. In one or more embodiments, the associated query manager 110 inputs the topic to a pre-trained generative large language model (LLM) in order to generate associated queries. For example, a generative LLM may be OpenAI's GTP models, Google's Bard, Meta's LLaMa, BigScience BLOOM, DALL-E, etc. One possible advantage of using a pre-trained generative model to generate associated queries based on the topic is that the LLM model is pretrained with a variety of inputs (e.g., a variety of human languages, a variety of programming languages, and/or a variety of content types, and therefore need not be finetuned or trained for a specific scenario.

As shown in FIG. 1, the one or more computing device(s) 102 further includes a heading manager 112. In one or more embodiments, the heading manager 112 generates one or more headings relating to the topic. For example, when a topic has been identified as 'trip to Vienna', a heading manager may generate headings, such as, 'Flights', 'Hotel', 'Visa requirements', 'Things to do', 'Restaurants', etc. An example of a heading user interface is further discussed in connection with FIGS. 8-2 through 8-7.

In one or more embodiments, the heading manager 112 receives from the associated query manager 110, the one or more associated queries, categorizes them based on a theme, and generates one or more headings for each theme. For example, if the associated queries received are 'where can I adopt a cat', 'how much does it cost to adopt a kitten', 'are there any kittens available near me', 'what food cats eat', 'how is kitten food different from adult food', and 'where can I buy cat food', the heading manager 112 may create two headings called 'adopting a cat' and 'food for a cat.' Examples of generating headings are further discussed in connection to FIG. 4 and FIG. 5. In one or more embodiments, the one or more associated queries are categorized under each generated heading. For example, in the example above, the 'adopting a cat' heading may include the following associated queries; 'where can I adopt a cat', 'how much does it cost to adopt a kitten', and 'are there any kittens available near me'. While the 'food for a cat' heading may include the following associated queries; 'what food cats eat', 'how is kitten food different from adult food', and 'where can I buy cat food'.

In one or more embodiments, the heading manager 112 generates the one or more headings relating to the topic, before (or at the same time) the associated query manager 110 generates the one or more associated queries. For example, if the identified topic is 'Trip to Vienna, Austria', the heading manager 112 may first generate headings, such as 'Flights', 'Hotels', 'Restaurants', and 'Things to do.' In one or more embodiments, the associated query manager 110 may generate associated queries under each of the generated headings.

In one or more embodiments, the heading manager 112 uses a deep learning model to generate the one or more headings for a topic. In one or more embodiments, the heading manager 112 uses a lookup table to generate the one or more headings. In one or more embodiments, the heading manager 112 inputs the topic to a pre-trained generative large language model (LLM). For example, a generative LLM may be OpenAI's GTP models, Google's Bard, Meta's LLaMa, BigScience BLOOM, DALL-E, etc. One possible advantage of using a pre-trained generative model for generating the one or more headings based on the topic is that the LLM model is pretrained with variety of inputs (e.g., a variety of human languages, a variety of programming languages, and/or a variety of content types, and therefore need not be finetuned or trained for a specific scenario.

In one or more embodiments, the communication interface 114 is further configured to provide one or more of the one or more headings and the one or more associated queries relating to the topic. For example, the communication interface 114 may send the one or more associated queries to the user device 104 through the communication network 122. In another example, the communication interface 114 may send the one or more headings together with the one or more associated queries to the user device 104 through the communication network 122.

Figure 2:
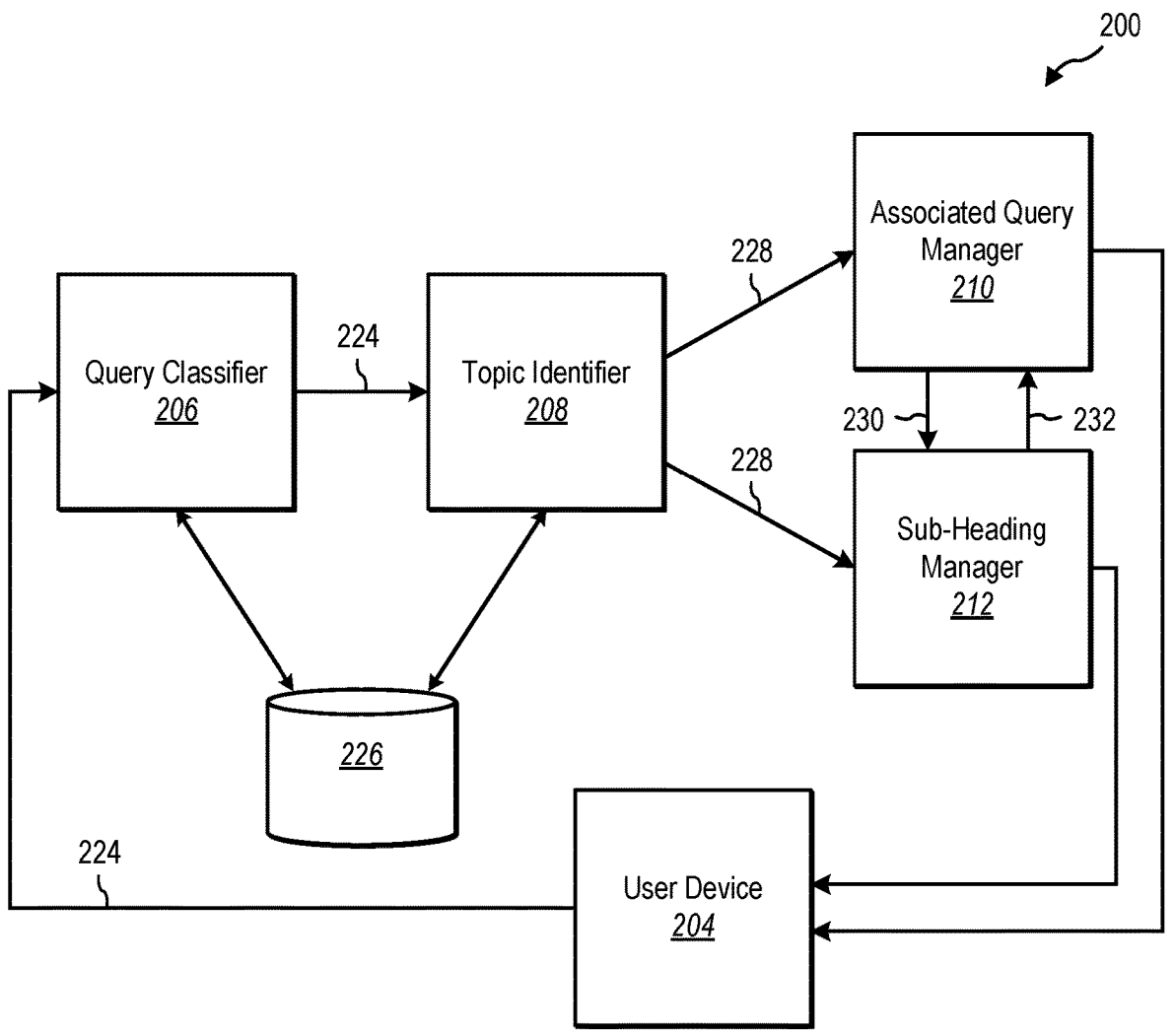
FIG. 2 illustrates an example workflow of a possible implementation of the enhanced search system in accordance with one or more embodiments.

FIG. 2 illustrates an example workflow of a possible implementation of the enhanced search system 200 in accordance with one or more embodiments. As shown in FIG. 2, a query classifier 206 may receive a prefix 224 from a user device 204. In one or more embodiments, the query classifier 206 may be the query classifier 106 as discussed in FIG. 1. In one or more embodiments, the query classifier 206 is configured to identify a user's intent to do an exploratory query based on the received prefix 224. In one or more embodiments, the query classifier 206 uses various different inputs to identify the user's intent. For example, the query classifier 206 may use one or more of a user profile information, a session history information, an exploratory query count information, and the received prefix to identify the user's intent. In one or more embodiments, the query classifier 206 may access one or more databases 226 to receive the one or more of the user profile information, the session history information, and the exploratory query count information. In one or more embodiments, the query classifier 206 provides the one or more of the user profile information, the session history information, the exploratory query count information, and the prefix 224 as inputs for a deep learning model, or any other machine learning model trained to classify a query into two or more categories, such as a navigation, a transactional, or an exploratory query. In some embodiments, the query classifier 206 classifies the query into two categories, such as exploratory query and non-exploratory query. If the query classifier 206 identifies that the user's intent is to do an exploratory query, the query classifier 206 provides the prefix to a topic identifier 208.

In one or more embodiments, the topic identifier 208 is configured to identify a topic based on the prefix 224. In one or more embodiments, the topic identifier 208 provides the prefix 224 as input for a deep learning model, or any other machine learning model trained to identify a topic based on the prefix 224. In one or more embodiments, the topic identifier 208 is configured to access one or more databases 226 to receive one or more of a user profile information, a session history information, and an exploratory query count information. In one or more embodiments, the topic identifier 208 may use the one or more of the user profile information, the session history information, the exploratory query count information, and the received prefix 224 as inputs for the deep learning model, or to the machine learning model to identify the topic. In one or more embodiments, the topic identifier 208 is configured to identify the topic together with the user's intent identification performed by the query classifier 206. For example, a deep learning model or a machine leaning model may have been trained to identify the user's intent and the topic based on one or more of the prefix 224, the user profile information, the session history information, and the exploratory query count information. After the topic identifier 208 has identified the topic, the topic identifier 208 may provide the identified topic 228 to an associated query manager 210 and to a heading manager 212.

In one or more embodiments, the associated query manager 210 is a software that intends to identify related aspects/concepts (e.g., associated queries) surrounding the identified topic 228. In one or more embodiments, the associated query manager 210 generates new related queries (e.g., associated queries) based on the identified topic 228. In one or more embodiments, the associated query manager 210 uses a deep learning model to generate the one or more associated queries for a topic.

In one or more embodiments, the heading manager 212 generates one or more headings relating to the identified topic 228. In one or more embodiments, the heading manager 212 uses a deep learning model to generate the one or more headings for the topic 228. In one or more embodiments, the heading manager 212 uses a lookup table to generate the one or more headings.

In one or more embodiments, the heading manager 212 receives from the associated query manager 210, the one or more associated queries 232, and categorizes them under the one or more generated headings before delivering them to the user device 204. In one or more embodiments, the associated query manager 210 receives from the heading manager 212, the one or more generated headings 230 and generates one or more associated queries under each of the one or more headings before delivering them to the user device 204.

Figures 1, 8:
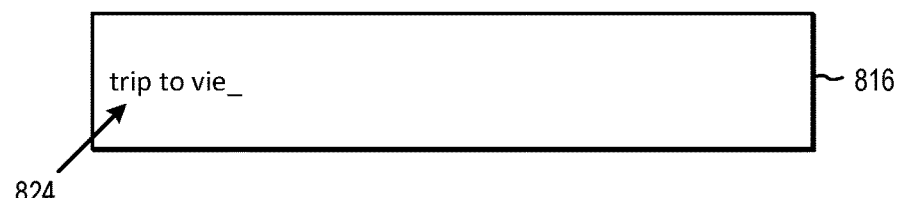
Figures 2, 8:
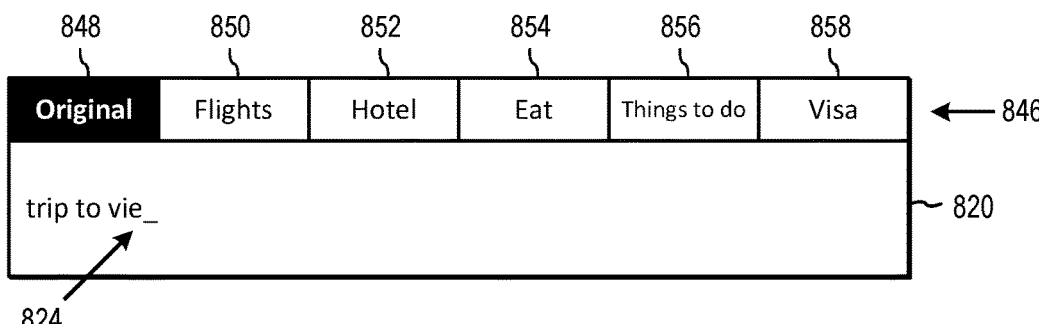
Figures 3, 8:
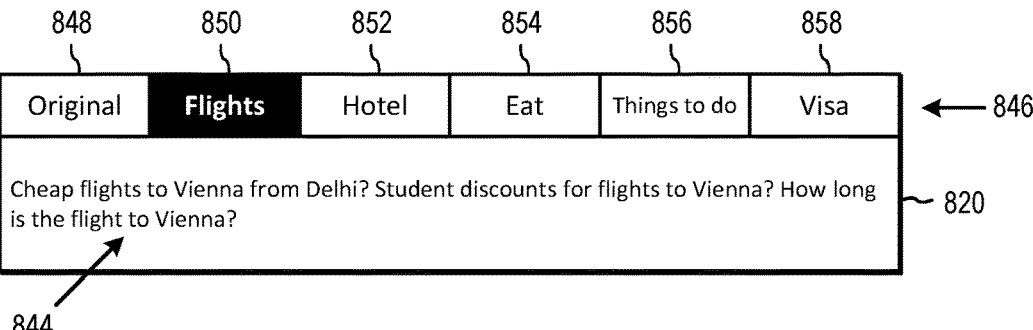
Figures 4, 8:
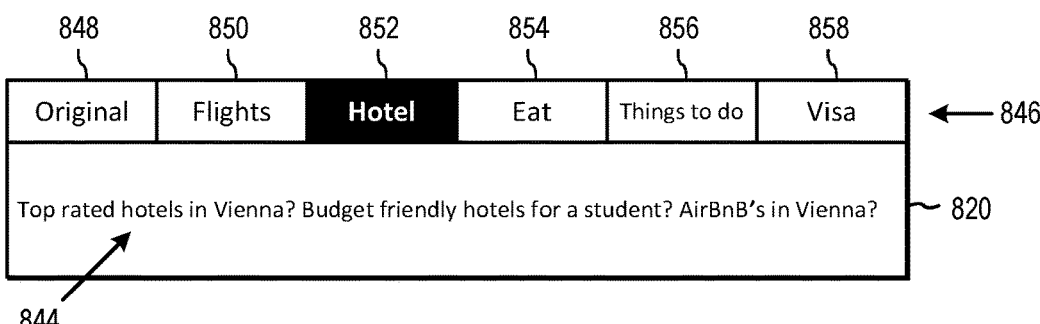

FIG. 3 illustrates an example of possible information 300 used by the enhanced search system for identifying a user's intent, in accordance with one or more embodiments. In one or more embodiments, the information 300 is also used for identifying a topic.

In one or more embodiments, session history information 336 is the history of queries performed during the ongoing session. In one or more embodiments, a session is a short time window. For example, it may be five minutes, thirty minutes, one hour, two hours, less than five minutes, or more than two hours. In one or more embodiments, a session is an uninterrupted search history without clearing the old searches. For example, a user interface may provide an option to clear out prior search history and start with a new one, hence as long as the user does not clear out the prior search history, the session history may include all the searches done. In the example shown in FIG. 3, the session history includes three prior searches done by the user during the ongoing session; 'neural networks', 'ReLU', and 'multilayer perceptron'.

In one or more embodiments, user profile information 334 may include demographic information about the user, such as age, location, etc. In one or more embodiments, the user profile information 334 may also include a long search history of the user. For example, a long search history may include searches done beyond the session history discussed above. In one or more embodiments, the user profile information 334 may also include information about pages the user has browsed previously. As shown in FIG. 3, the user profile information 334 includes demographics information, such as age, occupation, and location of the user. The user profile information 334 further includes recently browsed pages that show that the user has browsed the Massachusetts Institute of Technology webpage (mit.edu), and three different websites that provide opportunities to learn about various different subjects. The user profile information 334 further includes a long search history of the user, that includes searches such as 'neural networks', 'rectified linear unit', and 'artificial neuron.'

In one or more embodiments, the exploratory query count information 338 includes the number of exploratory queries done by a user previously. In one or more embodiments, the exploratory query count information 338 includes time stamps of the prior exploratory queries done. In one or more embodiments, the exploratory query count information 338 includes the count per time interval. For example, the exploratory query count information 338 may include the count of exploratory queries made each day (e.g., during each 24 h). In one or more embodiments, the exploratory query count information 338 includes percentage of exploratory queries made in comparison to all search queries made. In the example shown in FIG. 3, the exploratory query count information 338 includes a count of exploratory queries made each day in the last week and the percentage of exploratory queries made in relation to all search queries made by the user on that day. For example, on Monday, the user made one exploratory query, which corresponds to 5% of all the searches done by the user on that day. On Tuesday, the user made three exploratory queries, which corresponds to 15% of all the searches done by the user on that day. On Wednesday, the user made ten exploratory queries, which corresponds to 10% of all the searches done by the user on that day. On Thursday, the user made four exploratory queries, which corresponds to 40% of all the searches done by the user on that day. On Friday, the user made seven exploratory queries, which corresponds to 70% of all the searches done by the user on that day. On Saturday, the user made two exploratory queries, which corresponds to 50% of all the searches done by the user on that day. On Sunday, the user did not make any exploratory queries.

In one or more embodiments, the prefix 324 includes a partial word, a partial sentence, a full word, a full sentence, or a combination thereof. In one or more embodiments, the prefix is a fully typed query. In the example shown in FIG. 3, the prefix is 'convolut.'

In one or more embodiments, the enhanced search system may provide one or more of the information 300 to a deep learning model or a machine learning model for identifying the user's intent and/or the topic. In one or more embodiments, the enhanced search system provides the information 300 to a pre-trained generative large language model (LLM). For example, a generative LLM may be OpenAI's GTP models, Google's Bard, Meta's LLaMa, BigScience BLOOM, DALL-E, etc. One possible advantage of using a pre-trained generative model for identifying the user's intent and/or the topic is that the LLM model is pretrained with variety of inputs (e.g., a variety of human languages, a variety of programming languages, and/or a variety of content types, and therefore need not be finetuned or trained for a specific scenario.

In the example shown in FIG. 3, the model would compare the prefix 324, the user profile information 334, the session history information 336, and the exploratory query count information 338 to each other to determine the user's intent. For example, if the prefix is closely related to previous queries or previous exploratory queries made by the user, the model may conclude that the user intends to do an exploratory query. In another example, if the prefix is closely related to a recently browsed webpage and that the user's exploratory query count is very low, the model may conclude that the user intends to do a navigational query, rather than an exploratory query. In one or more embodiments, the model compares one or more of the user profile information 334, the session history information 336, the exploratory query count information 338, and the prefix 324 for identifying a topic. For example, as shown in FIG. 3, the model may determine that the topic is "neural networks."

Figure 4:
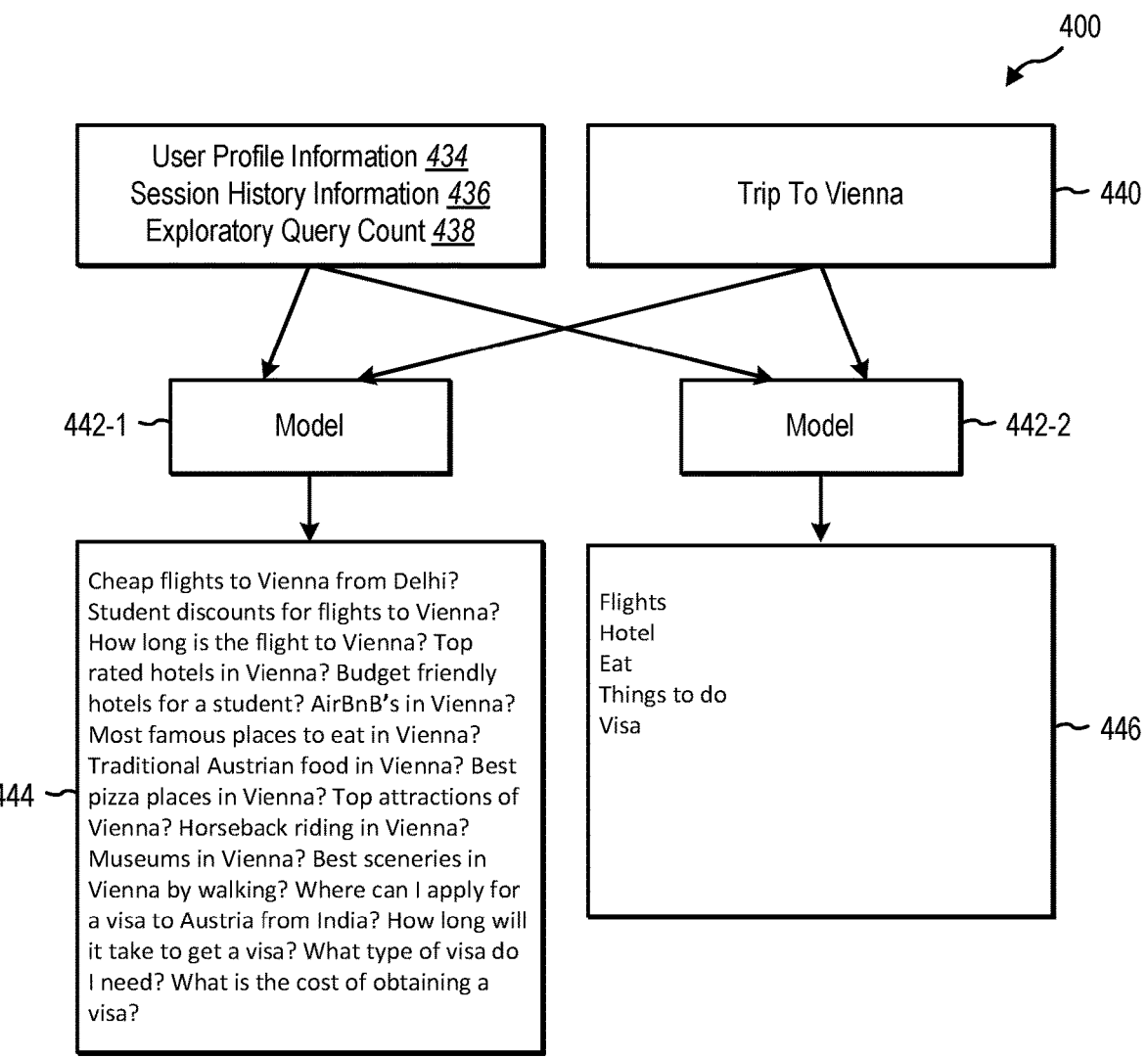
FIG. 4 illustrates an example of an enhanced search system for generating one or more associated queries and one or more headings relating to a topic, in accordance with one or more embodiments.

FIG. 4 illustrates an example of an enhanced search system 400 for generating one or more associated queries and one or more headings relating to a topic, in accordance with one or more embodiments. In one or more embodiments, after the topic 440 has been identified, the enhanced search system 400 uses it to generate one or more associated queries 444 and one or more headings 446. In one or more embodiments, the enhanced search system 400 uses the topic 440 together with one or more of the user profile information, the session history information, and the exploratory query count information to generate one or more associated queries 444 or the one or more headings 446. In one or more embodiments, the enhanced search system 400 provides the topic 440 to a model 442-1 to generate one or more associated queries 444 and provides the topic 440 to a model 442-2 to generate one or more headings 446. In one or more embodiments, both the one or more associated queries 444 and the one or more headings 446 can be generated by a same model, as further discussed in connection with FIG. 5. For example, the model 442-1 or the model 442-2 may be a deep learning model or a machine learning model that has been trained to generate the one or more associated queries 444 or the one or more headings 446. In another example, the model 442-1 or the model 442-2 is a pre-trained generative large language model (LLM). For example, a generative LLM may be OpenAI's GTP models, Google's Bard, Meta's LLaMa, BigScience BLOOM, DALL-E, etc. One possible advantage of using a pre-trained generative model for generating the one or more associated queries 444 and the one or more headings 446, is that the LLM model is pretrained with variety of inputs (e.g., a variety of human languages, a variety of programming languages, and/or a variety of content types), and therefore need not be finetuned or trained for a specific scenario.

In the example shown n FIG. 4, the topic 440 has been identified as 'Trip to Vienna.' The model 442-1 receives as an input the topic 440 and one or more of a user profile information 434, session history information 436, and exploratory query count information 438. The output from the model 442-1 is the one or more associated queries 444, which relate to the identified topic 440 'Trip to Vienna.' In the example shown in FIG. 4, some of the associated queries 444 have been generated partially based on the user profile information 434. For example, the user profile information 434 may have indicated that the user is a student, and therefore the associated queries 'student discounts for flight to Vienna' and 'budget friendly hotels for a student' have taken that into account in generating the associated queries. In another example, the user profile information 434 may have indicated that the user frequently visits PizzaHut.com for transactional intent, and therefore the associated query 'Best pizza places in Vienna' has taken that into account in generating the associated query. In yet another example, the user profile information 434 may have indicated that the user is located in Delhi, and therefore the associated queries 'cheap flights from Delhi' and 'Where can I apply for a visa to Austria from India' have taken that into account in generating the associated queries.

In the example shown in FIG. 4, some of the associated queries 444 have been generated partially based on the session history information 436. For example, the session history information 436 may have included searches made to museums in Vienna and horseback riding in Vienna before the exploratory query request that identified the topic as 'Trip to Vienna', and therefore the associated queries 'Horseback riding in Vienna' and 'Museums in Vienna' have taken that into account in generating the associated queries.

In one or more embodiments, the model 442-2 receives as an input the topic 440 and one or more of a user profile information 434, session history information 436, and exploratory query count information 438. The output from the model 442-2 is the one or more headings 446, which relate to the identified topic 440 'Trip to Vienna'. In the example shown in FIG. 4, the one or more headings 446 include 'Flights', 'Hotel', 'Eat', 'Things to do', and 'Visa.' In one or more embodiments, the one or more headings 446 may be generated based on the one or more associated queries 444. In one or more embodiments, the one or more associated queries 444 may be generated based on the one or more headings 446. In yet another embodiment, the one or more associated queries 444 and the one or more headings 446 may be generated concurrently. In one or more embodiment, the one or more associated queries 444 and the one or more headings 446 are provided to a user device, as further discussed in connection to FIGS. 8-1 through 8-7.

Figure 5:
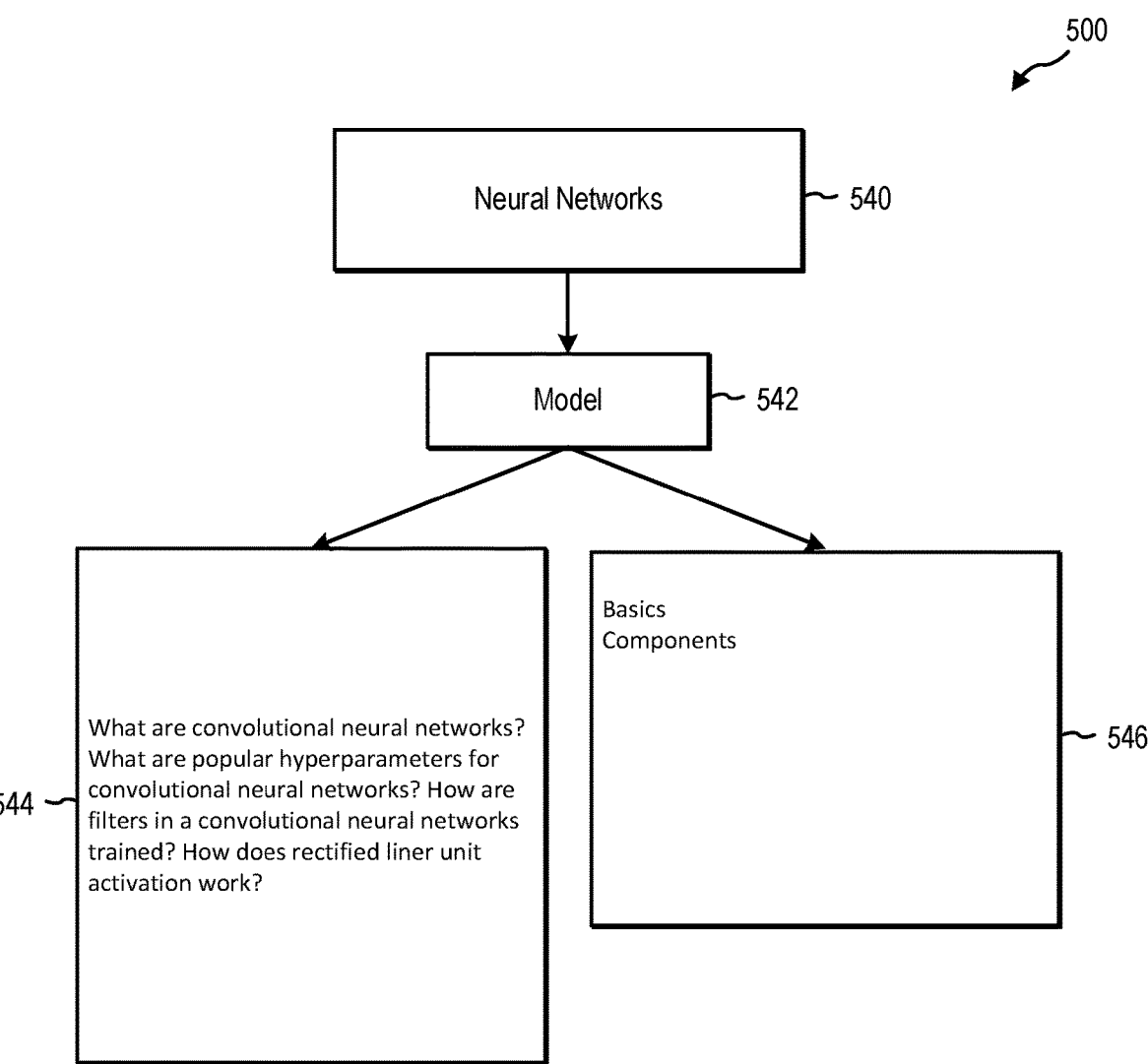
FIG. 5 illustrates an example of an enhanced search system for generating one or more associated queries and one or more headings relating to a topic, in accordance with one or more embodiments.

FIG. 5 illustrates an example of an enhanced search system 500 for generating one or more associated queries and one or more headings relating to a topic, in accordance with one or more embodiments. In one or more embodiments, the enhanced search system 500 uses the topic 540 together to generate one or more associated queries 544 and/or the one or more headings 546. As shown in FIG. 5, the enhanced search system 500 provides the topic 540 to a model 542 to generate one or more associated queries 544 and to generate one or more headings 546. For example, the model 542 may be a deep learning model or a machine learning model that has been trained to generate the one or more associated queries 544 and the one or more headings 546. In another example, the model 542 is a pre-trained generative large language model (LLM). For example, a generative LLM may be OpenAI's GTP models, Google's Bard, Meta's LLaMa, BigScience BLOOM, DALL-E, etc. One possible advantage of using a pre-trained generative model for generating the one or more associated queries 544 and the one or more headings 546, is that the LLM model is pretrained with a variety of inputs (e.g., a variety of human languages, a variety of programming languages, and/or a variety of content types), and therefore need not be finetuned or trained for a specific scenario.

In the example shown n FIG. 5, the topic 540 has been identified as 'Neural Networks.' The model 542 receives the topic 540 as an input and provides as an output the one or more associated queries 544 and the one or more headings 546. In the example shown in FIG. 5, the enhanced search system 500 has generated four associated queries 444 and two headings 446. In one or more embodiments, where the number of generated headings is below a threshold, the enhanced search system 500 provides only the one or more associated queries 544 to a user device. In the example shown in FIG. 5, the threshold for providing headings in the enhanced search system 500 is set to three, and hence the enhanced search system 500 only provides the one or more associated queries 544 to the user device without the one or more headings 546. An example of providing only the one or more associated queries 544 is further discussed in connection with FIGS. 9-1 and 9-2.

Figure 6:
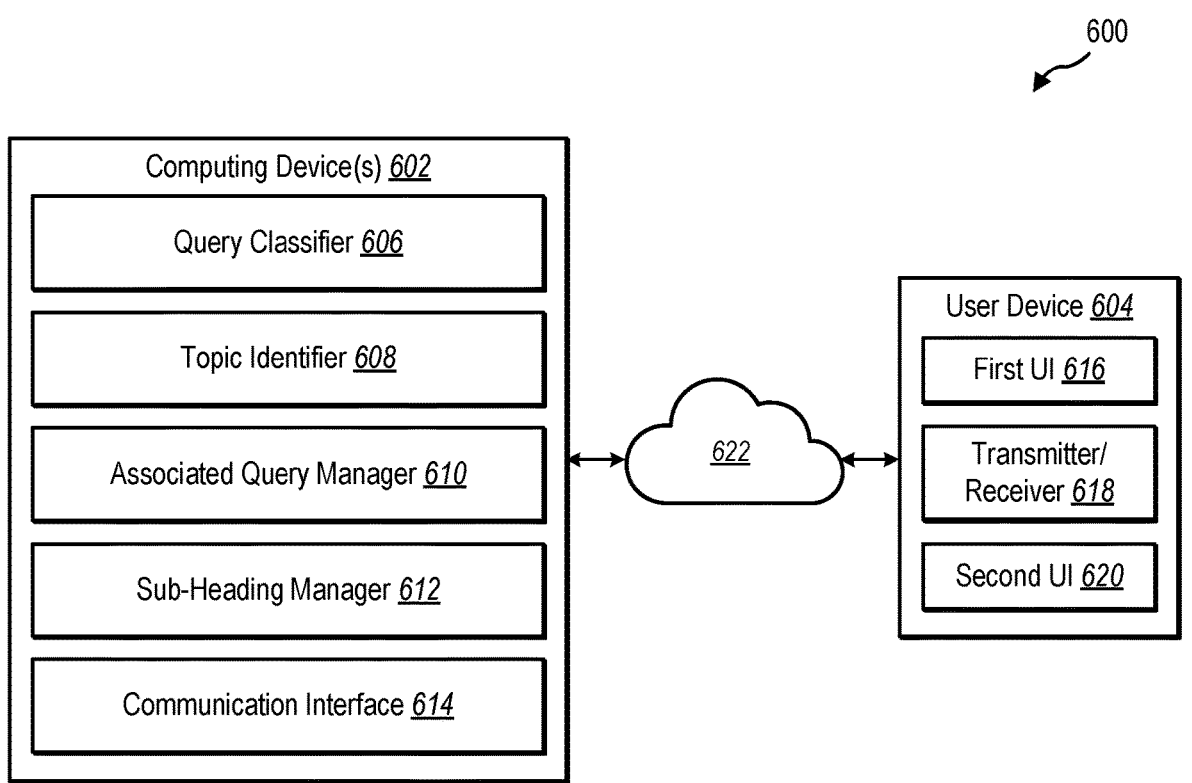
FIG. 6 illustrates an example environment showing systems and devices implementing an enhanced search functionality, in accordance with one or more embodiments.

FIG. 6 illustrates an example environment 600 showing systems and devices implementing an enhanced search functionality, in accordance with one or more embodiments. As shown in FIG. 6, the environment 600 includes one or more computing device(s) 602 and a user device 604. The one or more computing device(s) 602 may be in communication with the user device 604 via a communication network 622. The communication network 622 may include a plurality of different communication networks, such as a cloud computing network, Internet, a telecommunication network, a fixed network, and a WLAN network.

The user device 604 may refer to a variety of computing devices or end-user devices. For example, the user device 604 may refer to a mobile or non-mobile user device, such as a laptop, desktop, phone, tablet, information of things (IoT) device, or other device capable of communicating with computing device(s) 602 on the cloud computing system via one or more communication network 622. As shown in FIG. 6, the one or more computing device(s) 602 includes a query classifier 606, a topic identifier 608, an associated query manager 610, a heading manager 612, and a communication interface 614.

The query classifier 606 may include similar features and functionalities as the query classifier 106 in FIG. 1 and/or the query classifier 206 in FIG. 2. The topic identifier 608 may include similar features and functionalities as the topic identifier 108 in FIG. 1 and/or the topic identifier 208 in FIG. 2. The associated query manager 610 may include similar features and functionalities as the associated query manager 110 in FIG. 1 and/or the associated query manager 210 in FIG. 2. The heading manager 612 may include similar features and functionalities as the heading manager 112 in FIG. 1 and/or the heading manager 212 in FIG. 2. The communication interface 614 may include similar features and functionalities as the communication interface 114 in FIG. 1.

As shown in FIG. 6, the user device 604 includes a first user interface (UI) 616, a transmitter/receiver 618, and a second UI 620. In one or more embodiment, the first UI 616 may be a search UI including a search query box, configured to receive a user's input (e.g., a prefix). In one or more embodiments, the first UI 616 may be a search UI in an application stored in the user device 604. In one or more embodiments, the first UI 616 may be a search UI provided on a browser window of the user device 604. In one or more embodiments, the second UI 620 may be a chat UI including a search query box configured to receive one or more associated queries from the computing device(s) 602. In one or more embodiments, the second UI 620 is configured to display the one or more headings received from the computing device(s) 602. In one or more embodiments, the second UI 620 may be a chat UI in an application stored in the user device 604. In one or more embodiments, the second UI 620 may be a chat UI provided on a browser window of the user device 604. One possible difference between a search UI and a chat UI is that a search UI is capable of providing accurate search results based on a user's query whereas a chat UI is capable of generating content by utilizing language models and search engines.

In one or more embodiments, the transmitter/receiver 618 may be based on wired communication technology, wireless communication technology, or both. For example, the transmitter/receiver 618 may include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, an infrared (IR) communication port, or a combination thereof. In one or more embodiments, the transmitter/receiver 618 is configured to transmit the received prefix to the computing device(s) 602 via the communication network 622. In one or more embodiments, the transmitter/receiver 618 is configured to receive from the computing device(s) 602, one or more headings and/or one or more associated queries. In one or more embodiments, the one or more headings and/or one or more associated queries are presented at the second UI 620.

Figure 7:
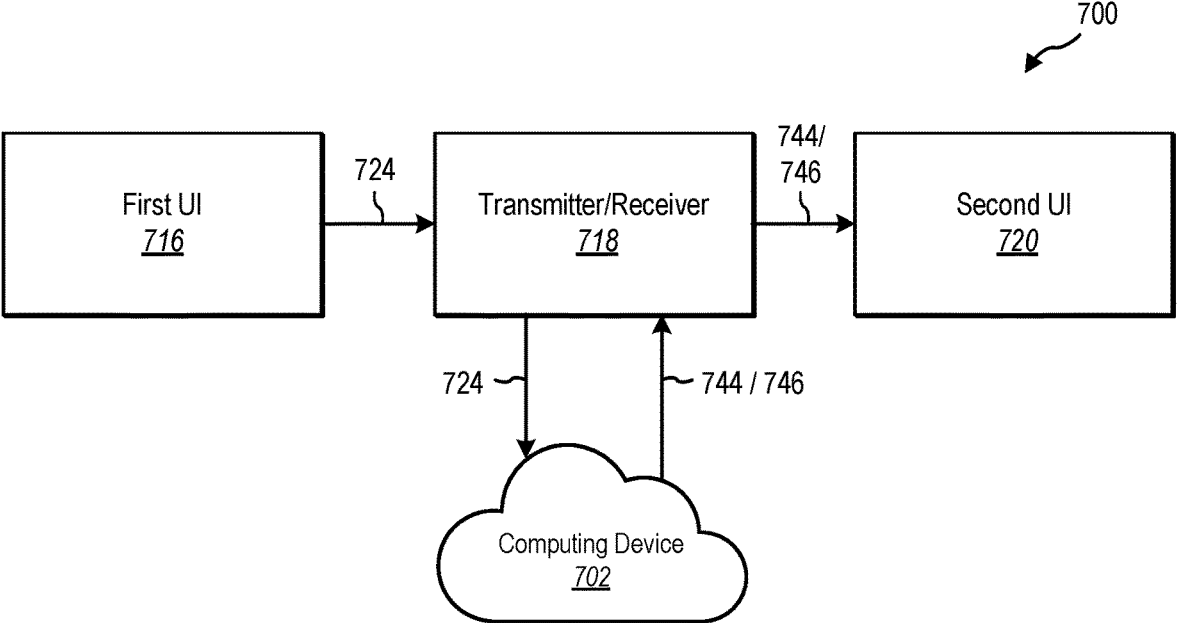
FIG. 7 illustrates an example workflow of a possible implementation of the enhanced search system in accordance with one or more embodiments.

FIG. 7 illustrates an example workflow of a possible implementation of the enhanced search system 700 in accordance with one or more embodiments. The system includes a first UI 716, configured to receive a prefix 724, wherein the prefix 724 relates to a topic. In one or more embodiments, the first UI 716 delivers the prefix 724 to a transmitter/receiver 718, such as the transmitter/receiver 618 as discussed in connection to FIG. 6. The transmitter/receiver 718 further transmits the prefix 724 to a computing device 702, such as the computing device(s) 102 of FIG. 1, or the computing device(s) 602 of FIG. 6. In one or more embodiments, the transmitter/receiver 718 receives from the computing device 702, one or more of headings 746 and/or associated queries 744. The transmitter/receiver 718 further transmits the one or more headings 746 and/or the associated queries 744 to a second UI 720 for presentation. Further examples of the presentation of the of or more headings 746 and the associated queries 744 are further discussed in connection with FIG. 8 and FIG. 9.

FIGS. 8-1 to 8-7 illustrate an example of user interfaces (UIs) of a possible implementation of the enhanced search system in accordance with one or more embodiments. In one or more embodiments, FIG. 8-1 represents a first UI 816 on a user device. As shown in FIG. 8-1 a prefix 824 was received on the first UI 816. In one or more embodiment, the enhanced search system, such as the system 400 shown in FIG. 4, provides the one or more associated queries 844 and the one or more headings 846, in response to receiving the prefix 824. As shown in FIG. 8-2, the user device displays the one or more associated queries 844 and the one or more headings 846 on a second UI 820. In one or more embodiments, the user device displays the one or more associated queries 844 and the one or more headings 846 on the first UI 816.

As shown on FIGS. 8-2 through 8-7, the second UI 820 displays the received six headings 846 as tabs to allow a user to easily navigate between the different query options. The first tab named 'Original' 848, has been pre-selected on FIG. 8-2. The 'Original' tab 848 displays the original prefix 824 'Trip to vie.' One possible advantage of providing the original prefix to the user is to allow the user to continue typing, in case the topic 'Trip to Vienna', was not a correct topic on what the user was trying to do, or if the user does not wish to do an exploratory query.

As shown in FIG. 8-3, the 'Flights' tab 850 has been selected. The second UI 820 in FIG. 8-3 displays the one or more associated queries 844 that relate to the 'Flights' tab 850. In FIG. 8-4, the 'Hotel' tab 852 has been selected. The second UI 820 in FIG. 8-4 displays the one or more associated queries 844 that relate to the 'Hotel' tab 852. In FIG. 8-5, the 'Eat' tab 854 has been selected. The second UI 820 in FIG. 8-5 displays the one or more associated queries 844 that relate to the 'Eat' tab 854. In FIG. 8-6, the 'Things to do' tab 856 has been selected. The second UI 820 in FIG. 8-6 displays the one or more associated queries 844 that relate to the 'Things to do' tab 856. In FIG. 8-7, the 'Visa' tab 858 has been selected. The second UI 820 in FIG. 8-7 displays the one or more associated queries 844 that relate to the 'Visa' tab 858. The one or more associated queries displayed on each of the one or more tabs (e.g., the headings) may be further modified before the search is executed. For example, a user may modify, delete, or add more queries to the second UI 820.

Figures 1, 9:
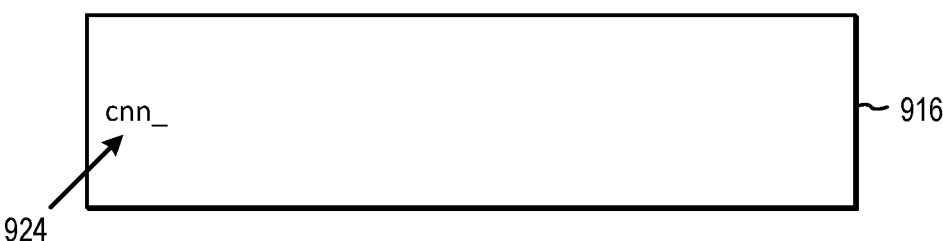
Figures 2, 9:
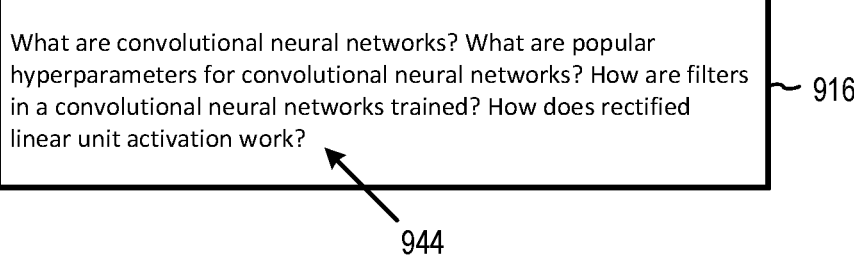

FIGS. 9-1 and 9-2 illustrate an example of user interfaces (UIs) of a possible implementation of the enhanced search system in accordance with one or more embodiments. FIG. 5 provided an example situation where the threshold for providing headings in the enhanced search system is set to three, and hence the enhanced search system only provides the one or more associated queries to the user device without the one or more headings. FIGS. 9-1 and 9-2 are an example of a first UI 916 in connection with the example provided in FIG. 5. As shown in FIG. 9-1, the first UI 916 receives a prefix 924 'cnn.' Based on the prefix, the enhanced search system 500 in FIG. 5 identified that the topic was 'Neural Networks' and generated one or more associated queries. In FIG. 9-2 the one or more associated queries 944 are displayed on the first UI 916. As shown in FIG. 9-2, when the threshold for headings is not met, the system delivers only the associated queries 944 to the user device for displaying.

Figure 10:
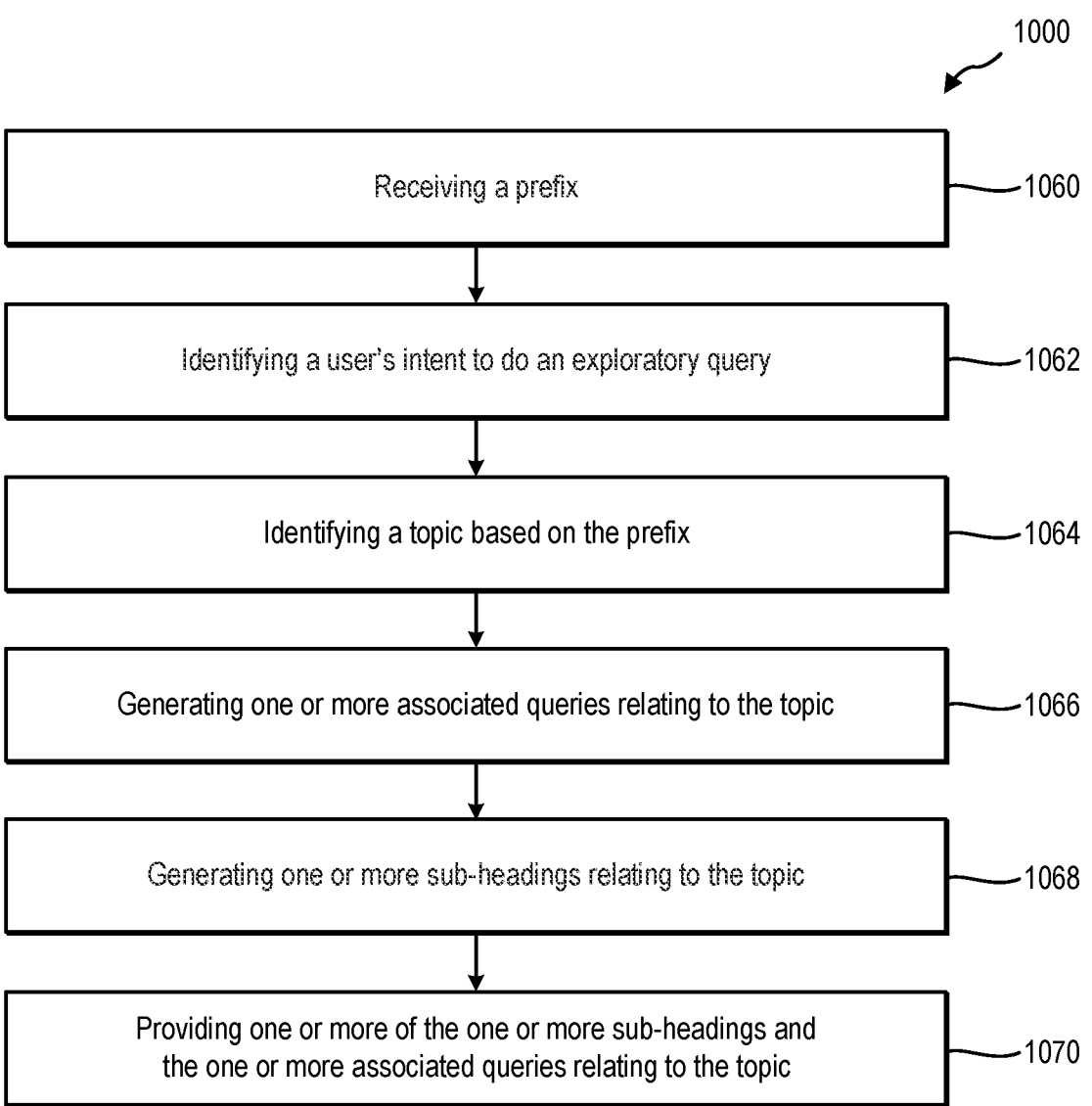
FIG. 10 illustrates a series of acts for providing enhanced search capabilities in a computing network, in accordance with one or more embodiments.

FIG. 10 illustrates a series of acts 1000 for providing enhanced search capabilities in a computing network, in accordance with one or more embodiments. While FIG. 10 illustrates acts according to one or more embodiments, alternative embodiments may omit, add to, reorder, and/or modify any of the acts shown in FIG. 10. The acts of FIG. 10 can be performed as part of a method. Alternatively, a non-transitory computer-readable medium can include instructions that, when executed by one or more processors, cause a computing device to perform the acts of FIG. 10. In still further embodiments, a system can perform the acts of FIG. 10.

As shown in FIG. 10, the series of acts 1000 may include an act 1060 of receiving a prefix. In one or more embodiments, the prefix is a fully typed query. For example, the prefix may include the whole sentence or the whole word that a user intends to search. In one or more embodiments, a prefix may be a partially typed query. For example, it may be a partially typed sentence or a partially typed word. In one or more embodiments, the prefix is received from a user device.

The series of acts 1000 may also include an act 1062 of identifying a user's intent to do an exploratory query. In one or more embodiments, identifying the user's intent to do an exploratory query is based on one or more of a user profile, a session history, an exploratory query count, and the prefix. For example, the user profile may include one or more of languages used by the user, a user's occupation, a user's age, a user's browsing history, and a long search history of the user. In one or more embodiments, the session history includes one or more queries performed. In one or more embodiments, the exploratory query count includes a number of exploratory queries previously done by the user.

The series of acts 1000 may also include an act 1064 of identifying a topic based on the prefix. In one or more embodiments, the topic is identified by providing the prefix to a pre-trained large language model (LLM). In one or more embodiments, the topic is identified by providing the prefix to a deep learning model or a machine learning model. In one or more embodiments, the topic is identified by providing one or more of a user profile information, a session history information, an exploratory query count information, and the received prefix as inputs for the deep learning model, or to the machine learning model.

The series of acts 1000 may also include an act 1066 of generating one or more associated queries relating to the topic. In one or more embodiments, the one or more associated queries are generated by providing the topic to a pre-trained large language model (LLM). In one or more embodiments, associated queries are generated by providing the topic to a deep learning model or a machine learning model. In one or more embodiments, associated queries are generated by providing one or more of a user profile information, a session history information, an exploratory query count information, and the topic as inputs for the deep learning model, or to the machine learning model.

The series of acts 1000 may also include an act 1068 of generating one or more headings relating to the topic. In one or more embodiments, the one or more headings are generated by providing the topic to a pre-trained large language model (LLM). In one or more embodiments, headings are generated by providing the topic to a deep learning model or a machine learning model. In one or more embodiments, headings are generated by providing one or more of a user profile information, a session history information, an exploratory query count information, and the topic as inputs for the deep learning model, or to the machine learning model. In one or more embodiments, the associated queries are categorized into the one or more headings.

The series of acts 1000 may also include an act 1070 of providing one or more of the one or more headings and the one or more associated queries relating to the topic. In one or more embodiments, the one or more of the one or more headings and the one or more associated queries are provided to a user device.

FIG. 11 illustrates a series of acts 1100 for providing enhanced search capabilities in a computing network, in accordance with one or more embodiments. While FIG. 11 illustrates acts according to one or more embodiments, alternative embodiments may omit, add to, reorder, and/or modify any of the acts shown in FIG. 11. The acts of FIG. 11 can be performed as part of a method. Alternatively, a non-transitory computer-readable medium can include instructions that, when executed by one or more processors, cause a computing device to perform the acts of FIG. 11. In still further embodiments, a system can perform the acts of FIG. 11.

As shown in FIG. 11, the series of acts 1100 may include an act 1172 of receiving a prefix through a first user interface. In one or more embodiments, the prefix is a fully typed query. For example, the prefix may include the whole sentence or the whole word that a user intends to search. In one or more embodiments, a prefix may be a partially typed query. For example, it may be a partially typed sentence or a partially typed word. In one or more embodiments, the prefix is received from a user device. In one or more embodiments, the first user interface is a search user interface.

The series of acts 1100 may also include an act 1174 of identifying a user's intent to do an exploratory query. In one or more embodiments, identifying the user's intent to do an exploratory query is based on one or more of a user profile, a session history, an exploratory query count, and the prefix. For example, the user profile may include one or more of languages used by the user, a user's occupation, a user's age, a user's browsing history, and a long search history of the user. In one or more embodiments, the session history includes one or more queries performed. In one or more embodiments, the exploratory query count includes a number of exploratory queries previously done by the user.

The series of acts 1100 may also include an act 1176 of identifying a topic based on the prefix. In one or more embodiments, the topic is identified by providing the prefix to a pre-trained large language model (LLM). In one or more embodiments, the topic is identified by providing the prefix to a deep learning model or a machine learning model. In one or more embodiments, the topic is identified by providing one or more of a user profile information, a session history information, an exploratory query count information, and the received prefix as inputs for the deep learning model, or to the machine learning model.

The series of acts 1100 may also include an act 1178 of generating one or more associated queries relating to the topic. In one or more embodiments, the one or more associated queries are generated by providing the topic to a pre-trained large language model (LLM). In one or more embodiments, associated queries are generated by providing the topic to a deep learning model or a machine learning model. In one or more embodiments, associated queries are generated by providing one or more of a user profile information, a session history information, an exploratory query count information, and the topic as inputs for the deep learning model, or to the machine learning model.

The series of acts 1100 may also include an act 1180 of generating one or more headings relating to the topic. In one or more embodiments, headings are generated by providing one or more of a user profile information, a session history information, an exploratory query count information, and the topic as inputs for the deep learning model, or to the machine learning model.

The series of acts 1100 may also include an act 1182 of categorizing the one or more associated queries into the one or more headings. For example, each of the one or more headings may include one or more of the generated associated queries.

The series of acts 1100 may also include an act 1184 of providing, through a second user interface, the one or more headings including the one of more associated queries. In one or more embodiments, the one or more of the one or more headings and the one or more associated queries are provided to a user device. In one or more embodiments, the second user interface is different from the first user interface. For example, the second user interface may be a chat interface.

Figure 12:
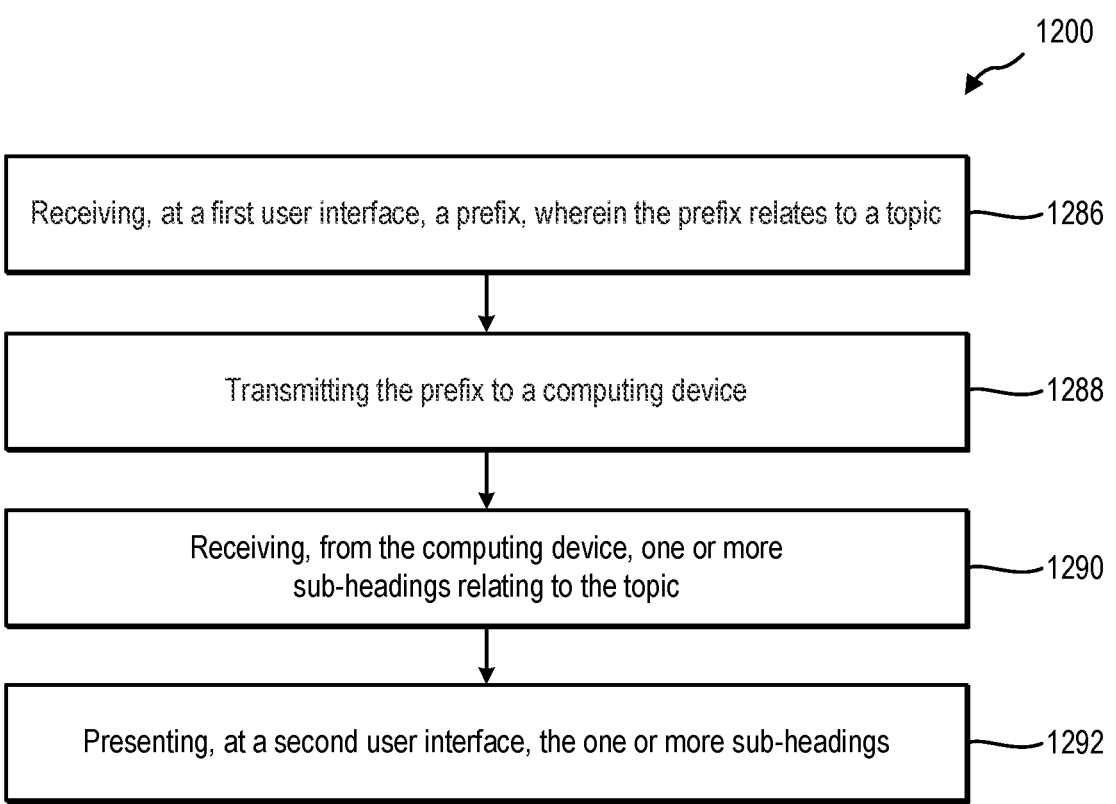
FIG. 12 illustrates a series of acts for receiving enhanced search options, in accordance with one or more embodiments.

FIG. 12 illustrates a series of acts 1200 for receiving enhanced search options, in accordance with one or more embodiments. While FIG. 12 illustrates acts according to one or more embodiments, alternative embodiments may omit, add to, reorder, and/or modify any of the acts shown in FIG. 12. The acts of FIG. 12 can be performed as part of a method. Alternatively, a non-transitory computer-readable medium can include instructions that, when executed by one or more processors, cause a computing device to perform the acts of FIG. 12. In still further embodiments, a system can perform the acts of FIG. 12.

As shown in FIG. 12, the series of acts 1200 may include an act 1286 of receiving, at a first user interface, a prefix, wherein the prefix relates to a topic. In one or more embodiments, the prefix is a fully typed query. For example, the prefix may include the whole sentence or the whole word that a user intends to search. In one or more embodiments, a prefix may be a partially typed query. For example, it may be a partially typed sentence or a partially typed word. In one or more embodiments, the prefix is received from a user device. In one or more embodiments, the first user interface is a search user interface.

The series of acts 1200 may also include an act 1288 of transmitting the prefix to a computing device. For example, a user device may transmit the prefix using a wired technology, wireless technology, or a combination thereof. For example, the prefix may be transmitted using a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, an infrared (IR) communication port, or a combination thereof.

The series of acts 1200 may also include an act 1290 of receiving, from the computing device, one or more headings relating to the topic. For example, the computing device may have identified the topic based on the prefix and used the topic to generate the one or more headings.

The series of acts 1200 may also include an act 1292 of presenting, at a second user interface, the one or more headings. In one or more embodiments, each of the one or more headings include one or more associated queries relating to the heading. In one or more embodiments, the second user interface is different from the first user interface. For example, the second user interface may be a chat interface.

Figure 13:
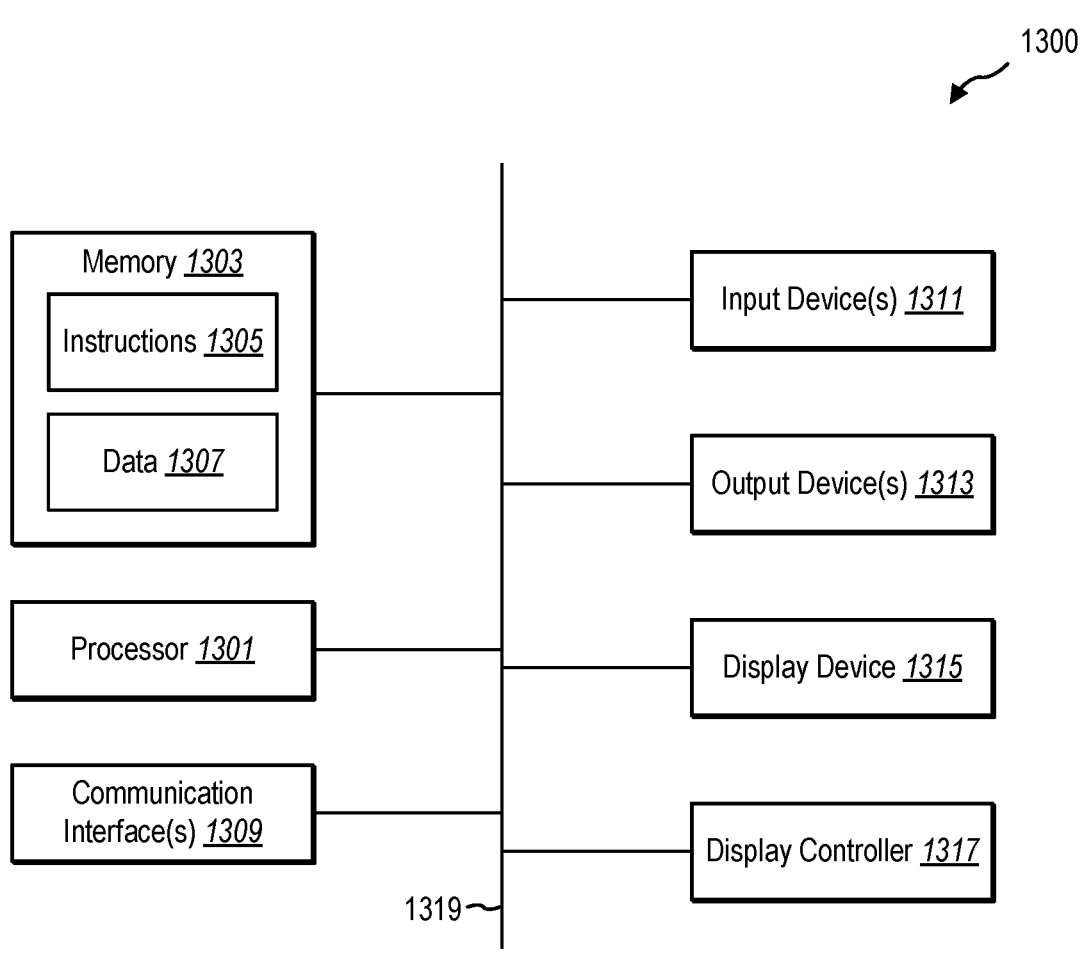
FIG. 13 illustrates certain components that may be included within a computer system, in accordance with one or more embodiments.

FIG. 13 illustrates certain components that may be included within a computer system 1300, in accordance with one or more embodiments. One or more computer systems 1300 may be used to implement the electrical devices, components, and systems described herein.

The computer system 1300 includes a processor 1301. The processor 1301 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 1301 may be referred to as a central processing unit (CPU). Although just a single processor 1301 is shown in the computer system 1300 of FIG. 13, in an alternative configuration, a combination of processors (e.g., an ARM and DSP) could be used. In one or more embodiments, the computer system 1300 further includes one or more graphics processing units (GPUs), which can provide processing services related to both neural network training and graph generation.

The computer system 1300 also includes memory 1303 in electronic communication with the processor 1301. The memory 1303 may be any electronic component capable of storing electronic information. For example, the memory 1303 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1305 and data 1307 may be stored in the memory 1303. The instructions 1305 may be executable by the processor 1301 to implement some or all of the functionality disclosed herein. Executing the instructions 1305 may involve the use of the data 1307 that is stored in the memory 1303. Any of the various examples of modules and components described herein may be implemented, partially or wholly, as instructions 1305 stored in memory 1303 and executed by the processor 1301. Any of the various examples of data described herein may be among the data 1307 that is stored in memory 1303 and used during execution of the instructions 1305 by the processor 1301.

A computer system 1300 may also include one or more communication interfaces 1309 for communicating with other electronic devices. The communication interface(s) 1309 may be based on wired communication technology, wireless communication technology, or both. Some examples of communication interfaces 1309 include a Universal Serial Bus (USB), an Ethernet adapter, a wireless adapter that operates in accordance with an Institute of Electrical and Electronics Engineers (IEEE) 902.11 wireless communication protocol, a Bluetooth® wireless communication adapter, and an infrared (IR) communication port.

A computer system 1300 may also include one or more input devices 1311 and one or more output devices 1313. Some examples of input devices 1311 include a keyboard, mouse, microphone, sensors, cameras, remote control device, button, joystick, trackball, touchpad, and lightpen. Some examples of output devices 1313 include a speaker and a printer. One specific type of output device that is typically included in a computer system 1300 is a display device 1315. Display devices 1315 used with embodiments disclosed herein may utilize any suitable image projection technology, such as liquid crystal display (LCD), light-emitting diode (LED), gas plasma, electroluminescence, or the like. A display controller 1317 may also be provided, for converting data 1307 stored in the memory 1303 into text, graphics, and/or moving images (as appropriate) shown on the display device 1315.

The various components of the computer system 1300 may be coupled together by one or more buses, which may include a power bus, a control signal bus, a status signal bus, a data bus, etc. For the sake of clarity, the various buses are illustrated in FIG. 13 as a bus system 1319.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for providing enhanced search capabilities, comprising:
    receiving a search query within a first interface that includes an input field;
    determining, using a query classification model, that the search query is classified as an exploratory query that is associated with performing a broader search exploring a topic; and
    based on the search query being classified as an exploratory query:
        determining the topic of the search query using a machine learning model;
        generating associated search queries for the topic;

generating a set of related headings corresponding to the topic using the machine learning model;

generating related associated search queries for each related heading in the set of related headings;

providing a second user interface that includes a heading element for the search query and related heading elements for each related heading in the set of related headings;

based on the heading element being selected, displaying the input field populated with the associated search queries for the topic; and providing each related heading in the set of related headings with corresponding related associated search queries, wherein the second user interface displays the heading element and each related heading element as selectable elements, and wherein the corresponding related associated search queries are hidden from display in the second user interface until a related heading element is selected within the second user interface to reveal the related associated search queries corresponding to the selected related heading element.

2. The method of claim 1, further comprising generating a query classification from the search query using a query classification machine learning model to generate the query classification from the search query, wherein the query classification machine learning model generates query classifications of a navigation query, a transactional query, or an exploratory query.

3. The method of claim 2, further comprising providing user profile information, session history information, or exploratory query count information to the query classification machine learning model along with the search query to generate the query classification.

4. The method of claim 3, wherein the topic is determined based on the query classification being classified with an exploratory query classification.

5. The method of claim 3, wherein:

the search query includes a prefix; and the prefix includes a partial word, a partial sentence, a full word, or a full sentence.

6. The method of claim 3, wherein the user profile information includes user location data, user languages, occupation information, age data, or browsing history.

7. The method of claim 3, wherein the session history information includes prior search queries of a user within a predetermined time window.

8. The method of claim 3, wherein the exploratory query count information includes a number of previous search queries performed by a user that were classified as exploratory queries.

9. The method of claim 1, wherein determining the topic based on the search query further includes:

providing the search query to a generative artificial intelligence (AI) model; and receiving the topic as an output from the generative AI model.

10. The method of claim 1, wherein generating the associated search queries includes using a generative AI model to generate the associated search queries based on the topic and the search query.

11. A system for providing enhanced search capabilities, comprising:

a processing system having a processor; and a computer memory including instructions that, when executed by the processing system, cause the system to carry out operations comprising:

receiving a search query through a first user interface that includes an input field;

determining, using a query classification model, that the search query is classified as an exploratory query that is associated with performing a broader search exploring a topic;

based on the search query being classified as an exploratory query:

identifying the topic based on the search query using a generative artificial intelligence (AI) model;

generating an associated search query for the topic based on providing the search query and the topic to the generative AI model;

generating a set of related headings relating to the topic based on providing the search query and the topic to the generative AI model;

generating a related associated search query for each related heading in the set of related headings based on providing the search query and the set of related headings to the generative AI model;

grouping each related associated search query with a corresponding related heading;

providing, in a second user interface that includes a heading element for the search query and related heading elements for the set of related headings;

based on the heading element being selected, displaying the input field populated with the associated search query for the topic; and providing each related heading in the set of related headings with a corresponding related associated search query, wherein the second user interface displays the heading element and each related heading element as selectable elements, and wherein each corresponding related associated search query is hidden from display in the second user interface until a related heading element is selected within the second user interface to reveal the related associated search query corresponding to the selected related headings element; and in response to detecting selection of the related heading element, updating the second user interface to display, within the input field, the related associated search query corresponding to the selected related headings element, and hide the associated search query for the topic that was displayed in the input field when the heading element was selected.

12. The system of claim 11, wherein the second user interface displays either:

the heading element with the associated search query replacing the search query in the input field; or a single selected related heading element corresponding to a related heading from the set of related headings and the corresponding related associated search query in the input field that replaces the associated search query.

13. The system of claim 11, wherein:

the topic is identified conditioned upon determining that the search query corresponds to an exploratory query; and determining that the search query corresponds to an exploratory query includes providing the search query and user information to a classifier machine learning model, which classifies the search query as the exploratory query.

14. A method of receiving enhanced search options, comprising:

receiving, at a first user interface that includes an input field, a search query relating to a topic;

determining, using a query classification model, that the search query is classified as an exploratory query that is associated with performing a broader search exploring a topic; and based on the search query being classified as an exploratory query:

determining the topic for the search query using a generative artificial intelligence (AI) model;

generating an associated search query for the topic based on providing the search query and the topic to the generative AI model;

providing the search query and the topic to the generative AI model to generate a set of related headings for the topic;

determining a related associated search query for each related heading in the set of related headings;

generating a second user interface that includes a heading element for the search query and related heading elements for the set of related headings, wherein each of the set of related headings includes a corresponding related associated search query;

based on the heading element being selected, displaying the input field populated with the associated search query for the topic, wherein only one header element is selected at a time to display a single set of corresponding associated queries; and presenting, in response detecting a selection of a related header element within the second user interface, the selected related headings element corresponding to a related header and the related associated search query corresponding to the related header within the input field, wherein, when the related header element is selected, the associated search query for the topic within the input field is hidden.

15. The method of claim 14, further comprising:

classifying the search query as an exploratory query based on providing the search query to a classification machine learning model, wherein determining the topic is based on the search query being classified as the exploratory query.

16. The method of claim 14, wherein:

the first user interface is a search interface;

the second user interface is a generative AI chat interface; and the second user interface is presented based on determining that the search query is classified with an exploratory query classification.

17. The method of claim 14, wherein the second user interface displays the related associated search query for the selected related headings element within a chat generative query field of a generative AI model.

18. The method of claim 17, wherein the chat generative query field enables the related associated search query for the selected related headings element to be modified prior to being submitted as a search prompt request.

19. The method of claim 14, wherein each of the related headings elements are displayed as individual selectable tabs.

20. The method of claim 14 wherein one or more of the set of related headings includes multiple corresponding associated search queries.

* * * * *